US006925384B2

(12) United States Patent
Frenkel et al.

(10) Patent No.: US 6,925,384 B2
(45) Date of Patent: Aug. 2, 2005

(54) METHOD FOR RESISTIVITY ANISOTROPY DETERMINATION IN CONDUCTIVE BOREHOLE ENVIRONMENTS

(75) Inventors: Michael A. Frenkel, Houston, TX (US); Ingo M. Geldmacher, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 23 days.

(21) Appl. No.: 10/674,365

(22) Filed: Sep. 29, 2003

(65) Prior Publication Data

US 2004/0117120 A1 Jun. 17, 2004

Related U.S. Application Data

(60) Provisional application No. 60/414,175, filed on Sep. 27, 2002.

(51) Int. Cl.$^7$ .............................. G01V 3/18; G01V 3/10
(52) U.S. Cl. ........................................... 702/7; 324/339
(58) Field of Search .............................. 702/7; 324/339, 324/338

(56) References Cited

U.S. PATENT DOCUMENTS

| 4,482,959 | A | 11/1984 | Minne ........................ 364/422 |
| 4,837,517 | A | 6/1989 | Barber ........................ 324/339 |
| 5,157,605 | A | 10/1992 | Chandler et al. ............ 364/422 |

(Continued)

FOREIGN PATENT DOCUMENTS

| GB | 2368915 A | 5/2002 |
| WO | WO02/071099 | 9/2002 |
| WO | WO02/073236 | 9/2002 |

OTHER PUBLICATIONS

Mezzatesta et al., Simultaneous Inversion of Galvanic and Induction Logging Measurements to Improve Resolution, Apr. 27–29, 1994, SPE 2679, XP–002269245, III Latin American/Caribbean Petroleum Engineering Conference, Buenos Aires, Argentina.*

M.A. Frenkel et al.; Improved Estimation of Hydrocarbon Reserves Using High–Definition Lateral Log Array Data in Vertical and Highly Deviated Wells, 2000 SPE Annual Technical Conference and Exhibition, Oct. 1–4, 2000. SPE–62912, pp. 1–13, 11 Figs.

M.A. Frenkel et al.; Application of Array Resistivity Measurements in Horizontal Wells, 2000 SPE Annual Technical Conference and Exhibition, Oct. 1–4, 2000, SPE 62913, pp. 1–14, 24 Figs.

A. G. Mezzatesta et al.; Simultaneous Inversion of Galvanic and Induction Logging Measurements to Improve Resolution, SPE 2679, XP–002269245, III Latin American/Caribbean Petroleum Engineering Conference, Buenos Aires, Argentina, Apr. 27–29, 1994, pp. 1059–1075, 8 Tables.

Primary Examiner—Michael Nghiem
Assistant Examiner—Toan M. Le
(74) Attorney, Agent, or Firm—Madan, Mossman & Sriram, P.C.

(57) ABSTRACT

A method for determining formation resistivity anisotropy in a wellbore environment. The method of the present invention effectively extends the dynamic range of the existing well logging service of the multi-component induction tool, allowing the use of this service in wells drilled with conductive WBM systems. A sequential inversion processing of galvanic array lateral log HDLL/MLL data or DLL/MLL and also multi-component induction log (3DEX$^{SM}$) data is used. The formation resistivity structure of the near wellbore environment is determined using the galvanic measurements of the array lateral log tool. The formation resistivity anisotropy of the undisturbed zone is determined using the result of the inversion of the galvanic array data and inversion of measurements of the multi-component induction tool

26 Claims, 9 Drawing Sheets

U.S. PATENT DOCUMENTS

| | | | |
|---|---|---|---|
| 5,329,448 A | 7/1994 | Rosthal | 364/422 |
| 5,452,761 A | 9/1995 | Beard et al. | 166/250 |
| 5,862,513 A * | 1/1999 | Mezzatesta et al. | 702/9 |
| 5,883,515 A * | 3/1999 | Strack et al. | 324/339 |
| 5,889,729 A | 3/1999 | Frenkel et al. | 367/73 |
| 5,999,883 A | 12/1999 | Gupta et al. | 702/7 |
| 6,044,325 A * | 3/2000 | Chakravarthy et al. | 702/7 |
| 6,060,885 A | 5/2000 | Tabarovsky et al. | 324/366 |
| 6,060,886 A | 5/2000 | Tabarovsky et al. | 324/373 |
| 6,147,496 A | 11/2000 | Strack et al. | 324/343 |
| 6,308,136 B1 * | 10/2001 | Tabarovsky et al. | 702/7 |
| 6,381,542 B1 * | 4/2002 | Zhang et al. | 702/7 |
| 6,502,036 B2 * | 12/2002 | Zhang et al. | 702/7 |
| 6,574,562 B2 * | 6/2003 | Tabarovsky et al. | 702/7 |
| 6,618,676 B2 * | 9/2003 | Kriegshauser et al. | 702/7 |
| 6,636,045 B2 * | 10/2003 | Tabarovsky et al. | 324/343 |
| 6,643,589 B2 * | 11/2003 | Zhang et al. | 702/7 |
| 6,760,666 B2 * | 7/2004 | Hagiwara | 702/7 |
| 6,810,331 B2 * | 10/2004 | Bittar et al. | 702/7 |
| 6,832,159 B2 * | 12/2004 | Smits et al. | 702/11 |
| 2003/0122547 A1 | 7/2003 | Prammer | 324/368 |
| 2003/0200029 A1 | 10/2003 | Omeragic et al. | 702/6 |

* cited by examiner

METHOD FOR RESISTIVITY ANISOTROPY DETERMINATION IN CONDUCTIVE BOREHOLE ENVIRONMENTS

CROSS REFERENCES TO RELATED APPLICATIONS

This application claims priority from U.S. Provisional Patent Application Ser. No. 60/414,175 filed on 27 Sep. 2002.

BACKGROUND OF THE INVENTION

1. Field of the Invention

The invention is related generally to resistivity anisotropy interpretation systems and methods for well logging applications. More specifically, the invention is a method of data inversion for determination of formation parameters and for a description of reservoirs.

2. Background of the Art

Electromagnetic induction and wave propagation logging tools are commonly used for determining electrical properties of formations surrounding a borehole. These logging tools give measurements of apparent resistivity (or conductivity) of the formation that, when properly interpreted, are diagnostic of the petrophysical properties of the formation and the fluids therein. Normally, wells drilled with non-conductive oil-based mud (OBM) provide an ideal environment for induction logging tools, such as the 3DEX$^{SM}$. However, in some environments, the drilling industry is turning from the use of OBM to environmentally sensitive water-based mud (WBM) systems. Highly conductive WBM tends to limit the effective dynamic range of formation measurements made with any induction logging tool.

The physical principles of electromagnetic induction resistivity well logging are described, for example, in H. G. Doll, Introduction to Induction Logging and Application to Logging of Wells Drilled with OBM, Journal of Petroleum Technology, vol. 1, p.148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517 issued to Barber; U.S. Pat. No. 5,157,605 issued to Chandler et al, and U.S. Pat. No. 5,452,761 issued to Beard et al.

U.S. Pat. No. 5,452,761 to Beard et al., the contents of which are fully incorporated herein by reference, discloses an apparatus and method for digitally processing signals received by an induction logging tool comprising a transmitter and a plurality of receivers. An oscillating signal is provided to the transmitter, which causes eddy currents to flow in a surrounding formation. The magnitudes of the eddy currents are proportional to the conductivity of the formation. The eddy currents in turn induce voltages in the receivers. The received voltages are digitized at a sampling rate well above the maximum frequency of interest. The digitizing window is synchronized to a cycle of the oscillating current signal. Corresponding samples obtained in each cycle are cumulatively summed over a large number of such cycles. The summed samples form a stacked signal. Stacked signals generated for corresponding receiver coils are transmitted to a computer for spectral analysis. Transmitting the stacked signals, and not all the individually sampled signals, reduces the amount of data that needs to be stored or transmitted. A Fourier analysis is performed of the stacked signals to derive the amplitudes of in-phase and quadrature components of the receiver voltages at the frequencies of interest. From the component amplitudes, the conductivity of the formation can be accurately derived.

A limitation to the electromagnetic induction resistivity well logging instruments such as that discussed in Beard et al. '761 is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art, these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

The effects of formation anisotropy on resistivity logging measurements have long been recognized. Kunz and Moran studied the anisotropic effect on the response of a conventional logging device in a borehole perpendicular to the bedding plane of thick anisotropic bed. Moran and Gianzero extended this work to accommodate an arbitrary orientation of the borehole to the bedding planes.

Rosthal (U.S. Pat. No. 5,329,448) discloses a method for determining the horizontal and vertical conductivities from a propagation or induction well logging device. The method assumes that the angle between the borehole axis and the normal to the bedding plane is known. Conductivity estimates are obtained by two methods. The first method measures the attenuation of the amplitude of the received signal between two receivers and derives a first estimate of conductivity from this attenuation. The second method measures the phase difference between the received signals at two receivers and derives a second estimate of conductivity from this phase shift. Two estimates are used to give the starting estimate of a conductivity model and based on this model. An attenuation and a phase shift for the two receivers are calculated. An iterative scheme is then used to update the initial conductivity model until a good match is obtained between the model output and the actual measured attenuation and phase shift.

U.S. Pat. No. 6,147,496 to Strack et al. teaches the use of an induction logging tool in which at least one transmitter and at least one receiver are oriented in orthogonal directions. By operating the tool at two different frequencies, it is possible to substantially reduce the effect of invasion and to determine the orientation of the tool to the bedding planes Received signals can be written as a series expansion in the frequency, which series expansion contains a term linear in the frequency which is mainly determined by the conductivity in the wellbore region. By combining the equation describing the series expansion of the signals in such a manner that the term linear in the frequency is eliminated, a new set of equations is obtained from which the influence of the wellbore region is virtually eliminated.

U.S. Pat. No. 5,999,883 issued to Gupta et al, (the "Gupta patent"), the contents of which are fully incorporated herein by reference, discloses a method for determination of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second rotation. An anisotropy parameter is calculated from the receiver signal magnitudes after the second rotation. Vertical conductivity is calculated from the horizontal conductivity and the anisotropy parameter.

U.S. Pat. No. 5,889,729 issued to Frenkel et al., the contents of which are fully incorporated herein by reference, discloses a method for acquiring and interpreting wellbore logging data and a method for such interpretation which is significantly faster than previously known methods and which can be used at a well site. Said system produces a final earth model of part of an earth formation having one or more layers. The method includes, in one aspect, generating an initial earth model based on raw data produced by a wellbore logging tool at a location in a borehole through the earth, performing 2-D forward modeling on the initial earth model to produce an interim earth model that includes a set of synthetic tool responses data for the wellbore logging tool, correcting measurements in each layer for shoulder-bed effect, and comparing the synthetic tool response data to the raw data to determine whether there is misfit between them. Various methods of forward modeling can be performed in the case of misfit. The method of Frenkel '729 can be used for any resistivity logging data.

A multi-component device is discussed in U.S. patent application Ser. No. 10/091,310 by Zhang et al, having the same assignee as the present application and the contents of which are incorporated herein by reference. This tool is marketed under the name 3DEX$^{SM}$ by Baker Hughes, Inc. The 3DEX$^{SM}$ device contains three transmitters and three receivers directed along orthogonal axes (x, y, z) with the z-component along the longitudinal axis of the drilling tool. The 3DEX$^{SM}$ tool measures three principal components $H_{xx}$, $H_{yy}$, $H_{zz}$ and two cross-components $H_{xy}$ and $H_{xz}$. The 3DEX$^{SM}$ device gives knowledge of resistivities and provides a process for general inversion of data. 3DEX$^{SM}$ is useful in determining orientation, given a sufficient selection of initial conditions. The 3DEX$^{SM}$ device collects data from the non-invaded zone to put in its model. Sensitivity to the initial conditions used in its data inversion affects the 3DEX$^{SM}$ device. There is a need to provide a method of 3DEX$^{SM}$ data interpretation.

Inversion processing of the 3DEX induction data allows the computation of both horizontal ($R_h$) and vertical ($R_v$) resistivities, thus allowing the determination of the formation resistivity anisotropy ratio ($\lambda = R_v/R_h$). Incorporation of these 3DEX data interpretation results in an enhanced shaly-sand, tensor resistivity petrophysical analysis, leads to reduced evaluation uncertainties and may result in a significant increase in calculated hydrocarbon-in-place reserves over estimates obtained with conventional methodologies. As shown in Frenkel '729, the 2-D inversion problem is subdivided into a sequence of smaller 1-D problems, thereby reducing computing time. For the 2-D inversion process, the vertical magnetic field component, $H_{zz}$, of the 3DEX data depends only on the horizontal resistivity, $R_h$. Therefore, it is possible to perform rapid sequential or even parallel 3DEX data inversion for both $R_h$ and $R_v$. This can lead immediately to a calculation of resistive anisotropy.

Another technique used in oil exploration is based on galvanic-type well logging measurements. Among these measurements are the Laterolog, Microlaterolog, Array Lateral Log, and other tools.

The Laterolog and Microlaterolog are taught in Doll, H. G., "The Laterolog", Paper 3198, in Transactions of the AIME, v 192, p. 305–316, 1951, and in Doll, H. G., "The Microlaterolog", Paper 3492, in Transactions of the AIME, v 198, p. 17–32, respectively. Generally, the Laterolog is an electrode device with multiple current electrodes configured in several different ways to produce several different responses. A current-emitting and current-return electrodes (A and B) are placed close together on the sonde, with a measure electrode (M) several feet away, and a measure return (N) far away. This arrangement is sensitive to the potential gradient between A and B.

The Array Lateral Log technology of data measurements and interpretation is taught in Hakvoort et al. paper "Field Measurements and Inversion Results of the High-Definition Lateral Log", Paper C, in Transactions of the SPWLA, 1998. It describes a differential array instrument and a method for determining selected parameters of an earth formation surrounding a borehole. This instrument includes a mandrel carrying a single source electrode for injecting an electrical current of a predetermined value into the formation surrounding the borehole, and an array of measurement electrodes uniformly and vertically spaced from the source electrode along the instrument mandrel. The plurality of the Array Lateral Log measurements may be correlated to a plurality of values representative of the selected formation parameters. The plurality of values representative of the selected formation parameters may provide a profile of the selected parameters over an increasing radial distance from the borehole.

In case of highly conductive borehole environments, we cannot neglect the borehole and invaded zone effects in any 3DEX-based data interpretation procedures. There is a need for a method for determination of a stable and unique anisotropy solution in highly conductive borehole environments. The present invention satisfies this need.

SUMMARY OF THE INVENTION

The invention is a method of determining a parameter of interest in an anisotropic earth formation in a conductive wellbore environment. The method of the invention described herein evaluates resistivity anisotropy. Data are acquired from a galvanic measuring device responsive primarily to parameters of an invaded zone and an uncontaminated zone surrounding the wellbore. Also, a multi-component device acquires measurement data responsive primarily to vertical and horizontal resistivity of the earth formation. The data acquired from a galvanic measuring device are inverted and upon inversion, enable the creation of a layered model of the invaded zone and the uncontaminated zones. Results of the model enable evaluation of formation resistivity data acquired from the deep-reading multi-component measuring device. The galvanic data may be acquired using a High-Definition Lateral Log and Microlaterolog (HDLL/MLL) or Dual Laterolog and Microlaterolog (DLL/MLL) devices, while the multi-component data is preferably acquired using a 3DEX$^{SM}$ device, with 3DEX$^{SM}$ data being acquired simultaneously with data from the galvanic logging device. In another embodiment, HDLL/MLL or DLL/MLL measurements can be obtained separately. Inverted data from multi-component measurements are compared with the output of a model. Output of the model can be obtained from any forward modeling program, such as, for instance, a finite-difference modeling program.

The method of the invention is employable at an arbitrary angle of inclination. An orientation device conveyed on the logging tool enables determining the toolface angle. A magnetometer, for example, can be employed as said orientation device.

DETAILED DESCRIPTION OF THE INVENTION

Figure 1:
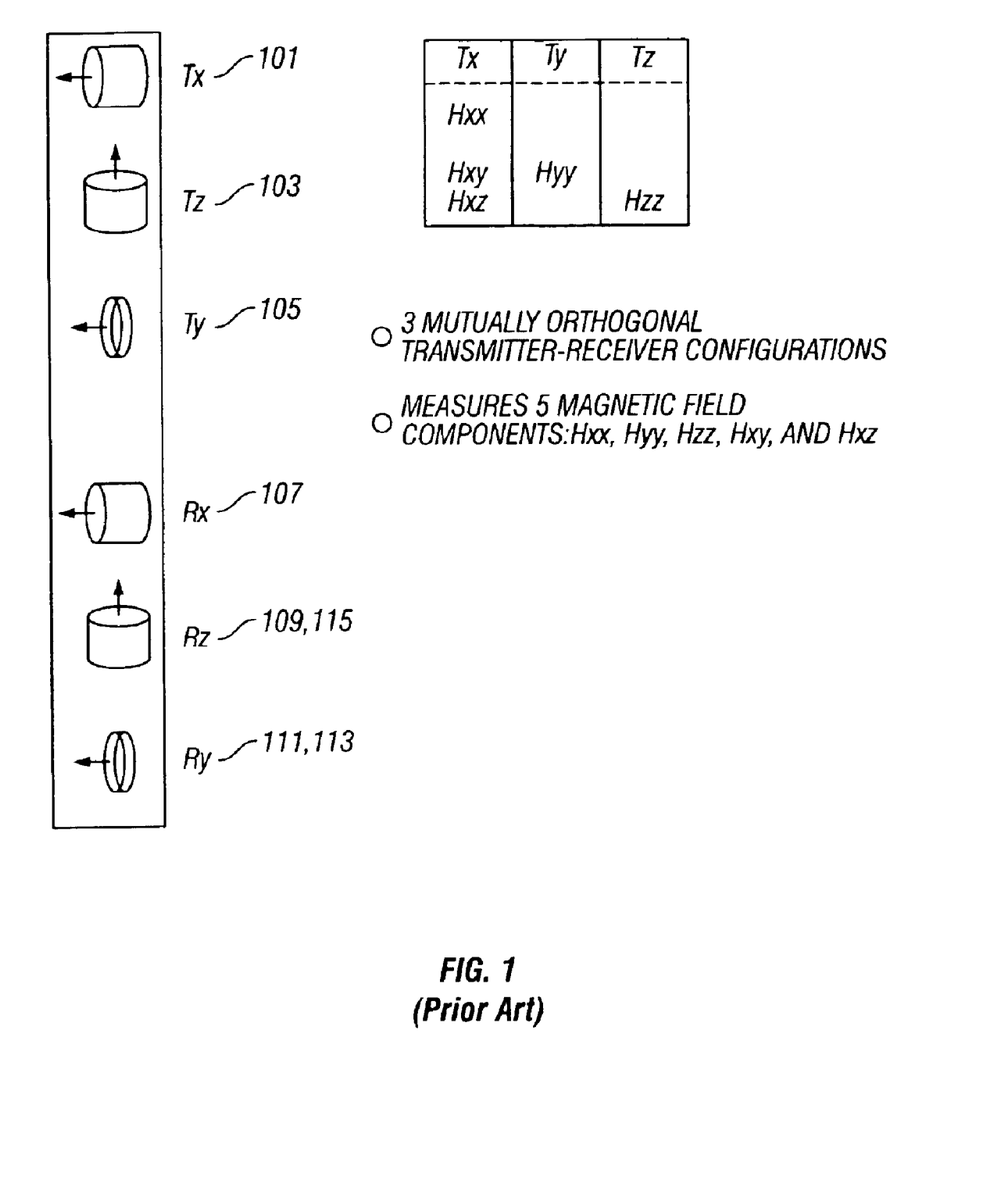
FIG. 1 (prior art) shows a physical layout of the three transmitter coils and three receiver coils of a multi-component logging tool (3DEX) suitable for use with the present invention.

FIG. 1 shows the configuration of transmitter coils and receiver coils in an embodiment of the 3Dexplorers$^{SM}$ (3DEX$^{SM}$) induction logging instrument of Baker Hughes Incorporated. Three transmitters 101, 103, and 105 that are referred to as the $T_x$, $T_z$, and $T_y$ transmitters are placed with their normals substantially orthogonal to each other, in the order shown. The three transmitters induce magnetic fields in three spatial directions. The subscripts (x, y, z) indicate an orthogonal system substantially defined by the directions of the normals to the transmitters. The z-axis is chosen to be substantially parallel to the longitudinal axis of the tool, while the x-axis and y-axis are mutually perpendicular directions lying in the plane transverse to the longitudinal axis. Corresponding to each transmitter 101, 103, and 105 are associated receivers 107, 109, and 111, referred to as the $R_x$, $R_z$, and $R_y$ receivers, aligned along the orthogonal system defined by the transmitter normals, placed in the order shown in FIG. 1. $R_x$, $R_z$, and $R_y$ are responsible for measuring the corresponding magnetic fields $H_{xx}$, $H_{zz}$, and $H_{yy}$. In this nominalization of the magnetic fields, the first index indicates the direction of the transmitter and the second index indicates the direction of the receiver. In addition, the receivers $R_y$ and $R_z$, placed in the order shown, correspondingly labeled 113 and 115, measure two cross-components, $H_{xy}$ and $H_{xz}$, of the magnetic field produced by the $T_x$ transmitter (101).

Dip angle is provided to 3DEX$^{SM}$ measurements by various methods, such as magnetometers. Knowledge of dip angle enables the method of the invention to operate both in vertical boreholes and in deviated boreholes. In a deviated borehole, orientation of the tool enables obtaining the tool face angle.

Figure 2A:
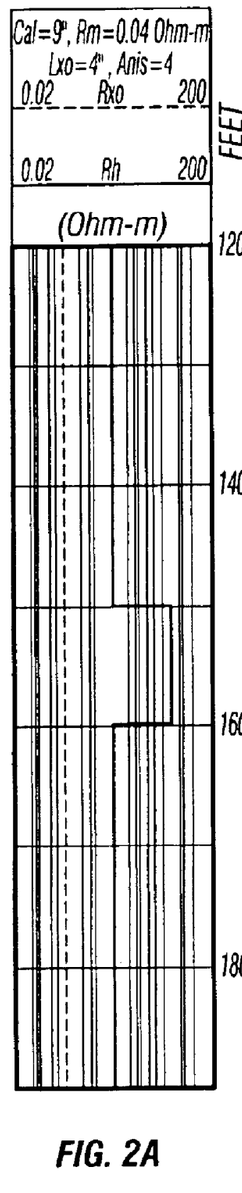
FIGS. 2a–2d show responses of the $H_{xx}$ component of a multi-component tool for two environmental conditions, with and without borehole and invasion, and at single and dual frequencies.
Figure 2B:
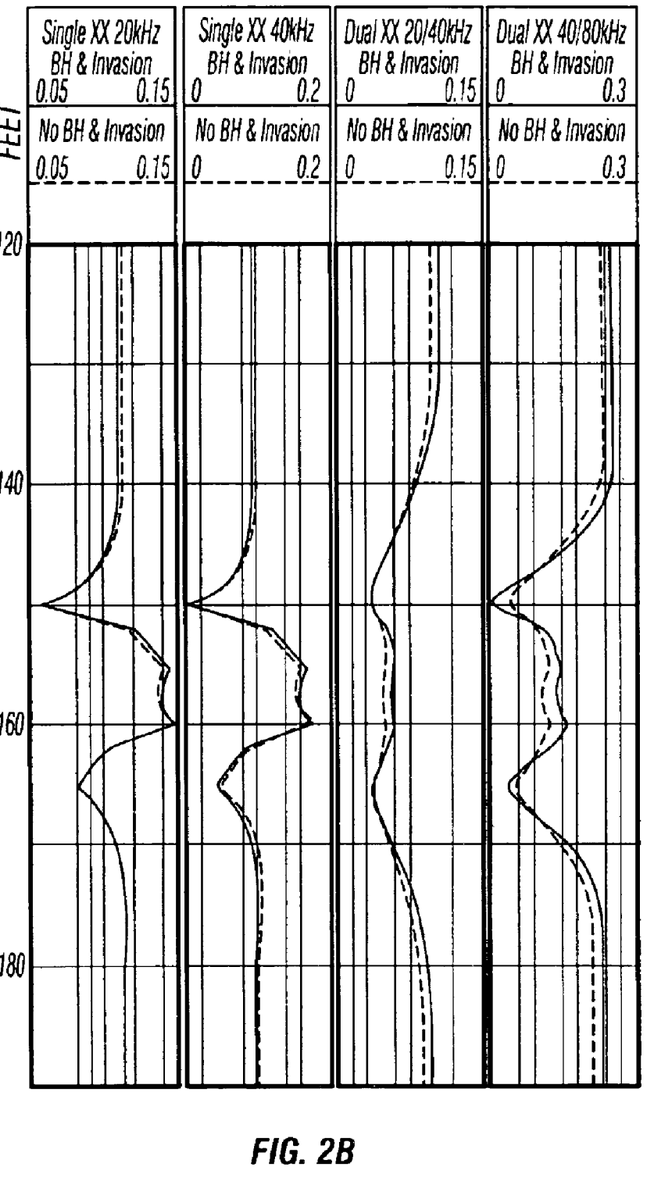

FIGS. 2a–2d illustrate the influence of the conductive borehole and of invasion on single frequency and dual frequency logs of the $H_{xx}$ component of the 3DEX$^{SM}$. The formation parameters or the model in FIG. 2a are as follows: the borehole diameter is ∅=9", and the borehole is filled with conductive mud $R_m$=0.04 Ω·m, the invasion is shallow, ($L_{xo}$=4") and conductive ($R_{xo}$=0.1 Ω·m). FIG. 2b shows the modeling results for the single frequency and dual frequency logs for two low frequencies: 20 and 40 kHz (single) and 20/40 and 40/80 kHz (dual). The main purpose of a dual frequency transformation of the single frequency data is to reduce the near-borehole effect. Application of the dual frequency in the interpretation process is critical to logging a borehole with a very conductive mud. The formula for the dual frequency (DF) transformation is $$H_{DF}(f_1, f_2) = H(f_1) - (f_1/f_2)/H(f_2)$$

where $H(f_1)$ and $H(f_2)$ are the magnetic fields measured at the single frequencies $f_1$ and $f_2$, respectively. The dual frequency transformation slightly reduces the vertical resolution of the interpreted results and is most effective at lower frequencies.

In two left most tracks of FIG. 2b is shown the single frequency logs for the $H_{xx}$ component. The two right most tracks show the dual frequency logs for the same $H_{xx}$ component. The calculations are performed with a three-layer, two-dimensional earth model (solid curves) and a simple horizontally layered (1-D) earth model (dashed curves). Each layer of this horizontally layered earth model consists of an uncontaminated zone only, i.e., neither a borehole nor invasion are present. It is observed that the near-wellbore effect is there, but it is relatively small.

Figure 2C:
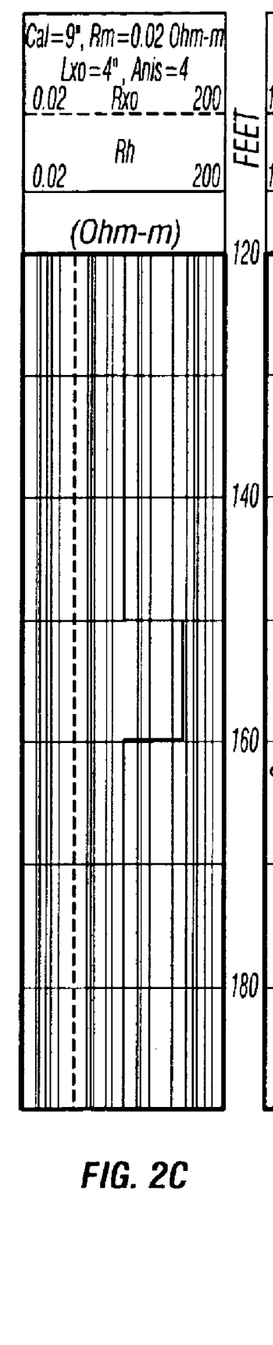
Figure 2D:
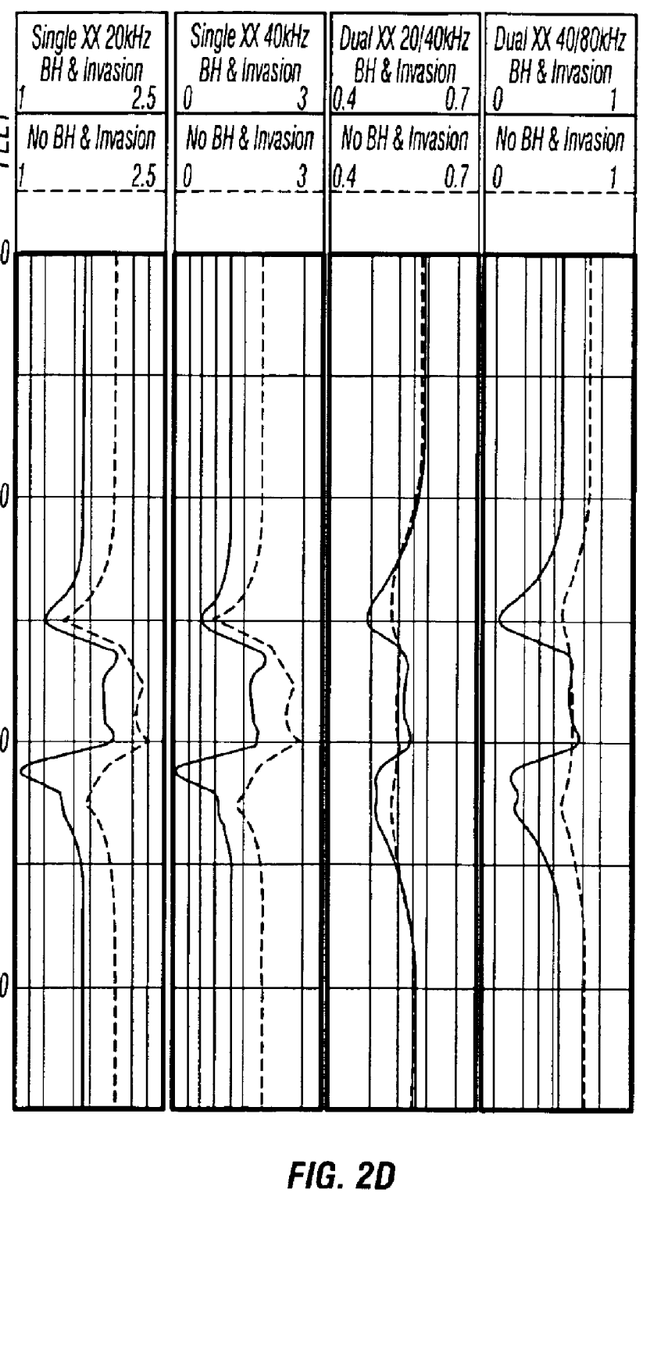

The situation changes dramatically when the amount of conductive material at the wellbore increases due, for example, to a larger and more conductive borehole, and/or deeper conductive invasion. FIG. 2c presents a similar three-layer model with the 12" diameter borehole filled with a more conductive mud ($R_m$=0.02 Ω·m). Here, the invasion depth is $L_{xo}$=12", and the invaded zone has the same resistivity, $R_{xo}$=0.1 Ω·m (see the left track), as before. FIG. 2d presents the modeling results for the same single frequency and dual frequency components for the model of FIG. 2c.

It is quite evident the dual frequency logs provide a lower vertical resolution than the corresponding SF logs, and the near-wellbore conductive zone has a strong effect on both the single frequency and dual frequency logs (compare solid and dashed logs in the four right most tracks of FIG. 2b).

It is precisely for this reason that, in case of highly conductive borehole environments, we cannot neglect the borehole and invaded zone effects in any 3DEX$^{SM}$-based data interpretation procedures.

To address this physical limitation in the induction data, the present invention is a new interpretation method that combines in a single interpretation scheme both galvanic and induction logging data so as to accurately recover formation resistivity anisotropy.

Figure 3:
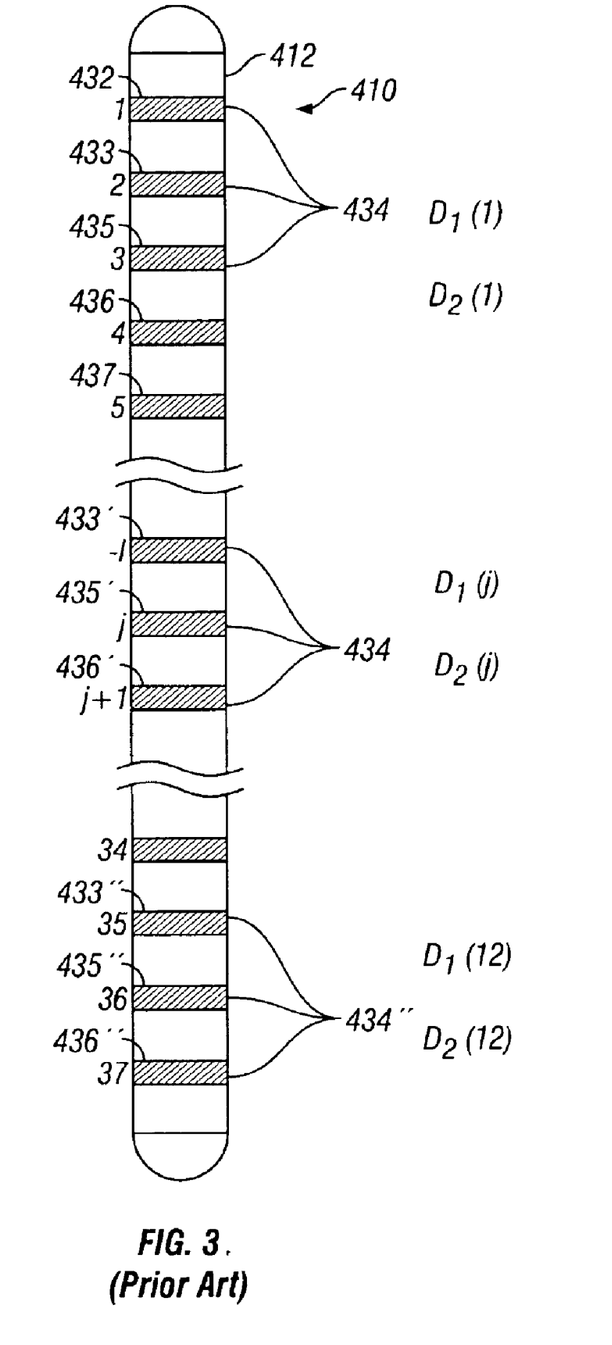
FIG. 3 (prior art) shows a galvanic logging instrument suitable for use with the present invention

U.S. Pat. No. 6,060,885 to Tabarovsky et al, the contents of which are incorporated herein by reference, discloses a galvanic measurement device for determining resistivity of a geological formation surrounding a borehole. As shown in FIG. 3, the instrument 410 includes a mandrel 412 carrying a single source electrode 532 and a plurality of measuring electrodes 433, 435, 436, 437, etc. vertically spaced in equal increments along the axis of the mandrel 412. The number of measuring electrodes chosen for this example is 36, which including the source electrode, makes a total of 37 electrodes which are marked 1–37 in FIG. 3. In the embodiment of FIG. 3, a group 434 of three successive electrodes 433, 435, and 436 are used to obtain measurements, for example, of first potential difference, $D_1$. For measurement of said potential difference, the source electrode 432 injects an electrical current of a predetermined value into the formation and it is received by successive lower vertical groups of three electrodes as at 434' and 434". The 36 measuring electrodes produce 12 measurements from successive electrode groups 434, 434', 434", etc. for measuring the first potential difference, thus: at 434-$D_1^{(I)}$, at 434'-$D_1^{(j)}$, and at 434"-$D_1^{(12)}$. Examining the electrode group identified as 534', the first vertically disposed measurement electrode is identified as j–1 (433'), the center electrode is identified as j (435'), and the third or lower electrode is identified as j+1 (536'). The first potential difference $D_1^{(j)}$ is calculated as:

$$D_1^{(j)} = \frac{V_{j+1} - V_{j-1}}{2}.$$

Accordingly, each measurement unit provides first differences, $D_1$ at each depth level. The differential conductance is also available at each logging depth.

The application of the multi-component induction tool supplies the log analyst with unique information to determine formation resistivity anisotropy. To overcome the challenge of limited effective dynamic range caused by WBM systems, the multi-component measuring device is logged in combination with a galvanic tool. As an example, HDLL/MLL or DLL/MLL devices can be used as the galvanic measuring devices, and 3DEX$^{SM}$ can be used as a multi-component measuring device. However, use of any of these tools is not meant as a restriction on the scope of the invention. Inversion-based data interpretation proceeds by first determining the formation resistivity structure of the near wellbore environment using the galvanic measuring device, and then determining the formation resistivity anisotropy of the undisturbed zone using these determined results from the galvanic device and the deep induction measurements of the multi-component measuring device. The measurements provided by the galvanic measuring tool enable evaluation of the drilling fluid invasion profile to the inversion of multi-component measurement data.

Figure 4:
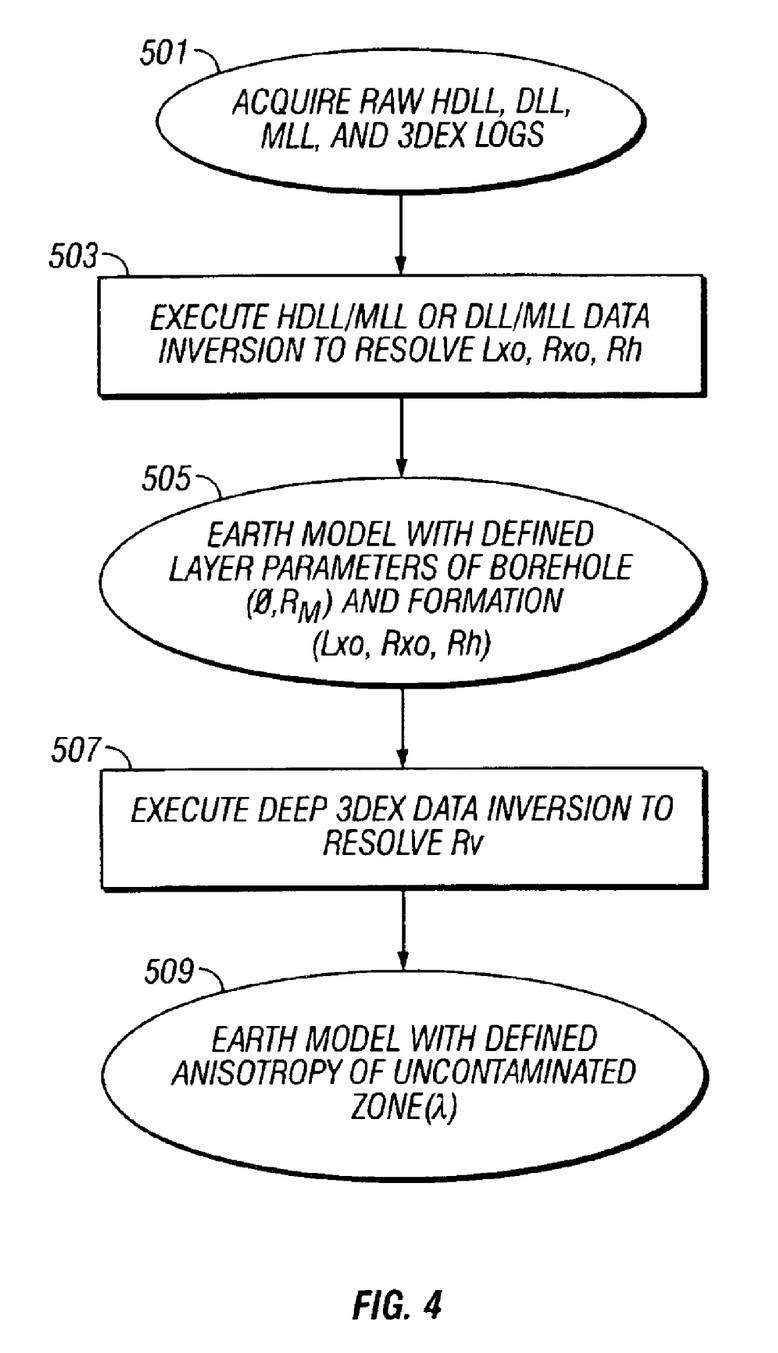
FIG. 4 shows a flowchart of the method of the present invention.
Figure 5:
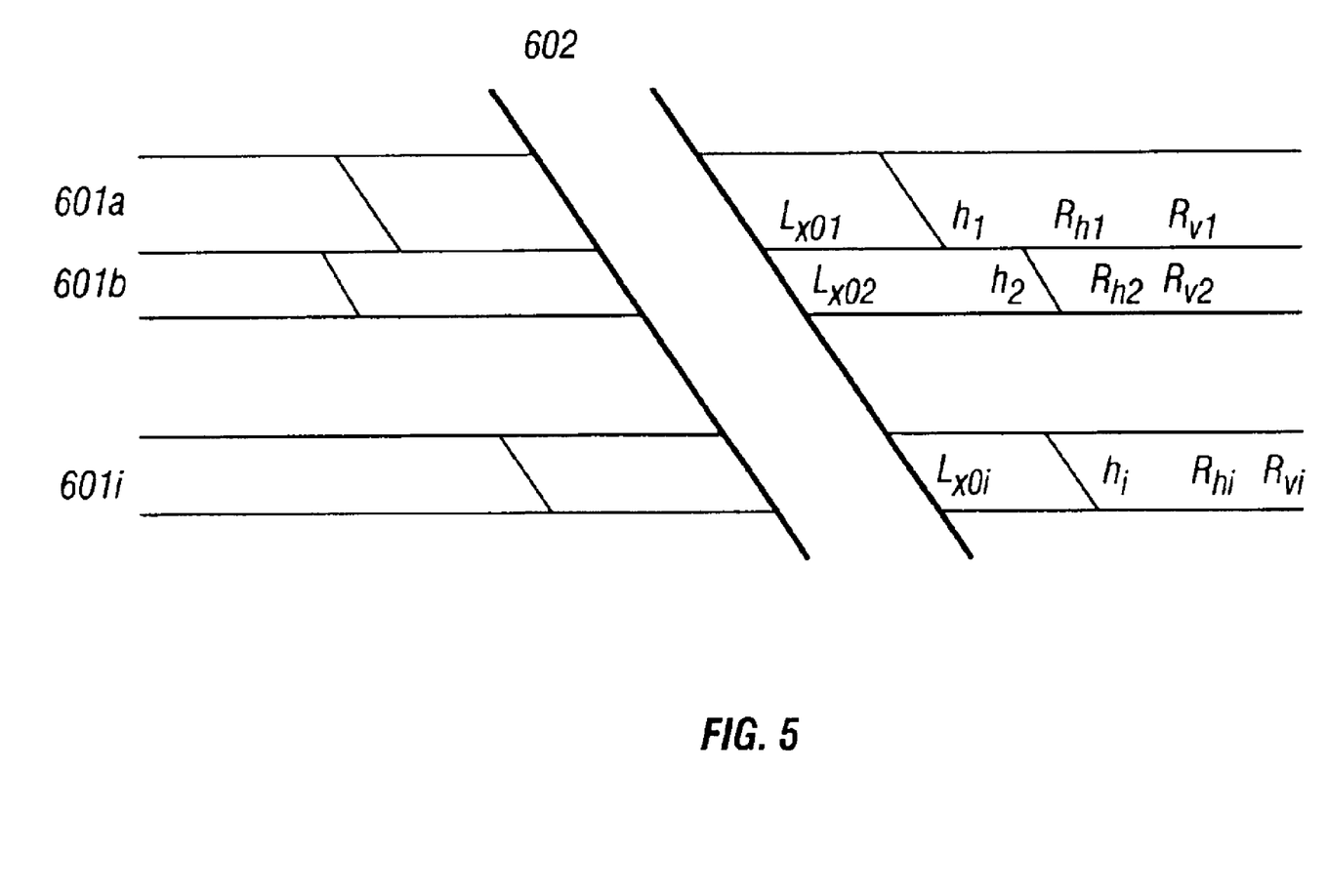
FIG. 5 shows an earth model example used in the present invention.

The method of the invention is outlined in more detail in FIG. 4. In Box 501, raw data is collected from at least one galvanic measuring device and also from a multi-component measuring device. The galvanic measuring device generally provides information of the structure of the conductive near wellbore environment, while the multi-component measuring device generally obtains information on parameters far from the measurement tool As shown in FIG. 5, subsurface of the earth is characterized by a plurality of layers 601a, 601b, . . . , 601i. The layers have thicknesses denoted by $h_1$, $h_2$, . . . $h_i$. The horizontal and vertical resistivities in the layers are denoted by $R_{h1}$, $R_{h2}$, . . . $R_{hi}$ and $R_{v1}$, $R_{v2}$, . . . $R_{vi}$ respectively. Equivalently, the model may be defined in terms of conductivities (reciprocal of resistivity). The borehole is indicated by 602 and associated with each of the layers are invaded zones in the vicinity of the borehole wherein borehole fluid has invaded the formation and altered is properties so that the electrical properties are not the same as in the uninvaded portion of the formation. The invaded zones have lengths $L_{x01}$, $L_{x02}$, . . . $L_{x0i}$ extending away from the borehole. The resistivities in the invaded zones are altered to values $R_{x01}$, $R_{x02}$, . . . $R_{x0i}$. In the embodiment of the invention discussed here, the invaded zones are assumed to be isotropic while an alternate embodiment of the invention includes invaded zones that are anisotropic, i.e., they have different horizontal and vertical resistivities. It should further be noted that the discussion of the invention herein may be made in terms of resistivities or conductivities (the reciprocal of resistivity). Parameters of isotropic invaded zone and horizontal resistivity of uncontaminated zone are assumed to be determined via inversion processing of the galvanic data.

Returning to FIG. 4, a data inversion of galvanic measurement data is performed (Box 503). In box 505, an initial earth model for further anisotropy inversion using the 3DEX data is introduced having parameters defined corresponding to each layer of the borehole (i.e. diameter of borehole, Ø, resistivity of borehole fluid, $R_m$) and of invasion (i.e. length of invaded zone, $L_{xo}$, and resistivity of invaded zone, $R_{xo}$) and of horizontal resistivity $R_h$. The resistivity of borehole fluid can be provided previously, for instance, by the operator. The value of the diameter of the borehole could be determined using a suitable device such as a mechanical caliper or an acoustic calipert. In Box 507, an inversion of deep 3DEX$^{SM}$ measurement data is undertaken using results from Box 505. It is to be noted that the near-zone parameters, $R_{xo}$ and $L_{xo}$, are not updated during the inversion at 507. At this step, the 3DEX data inversion is performed to update previously determined horizontal resistivity $R_h$ and define the vertical resistivity $R_v$. In Box 509, an anisotropic earth model results, having anisotropy defined in each layer of the undisturbed zone. An example of the use of inversion for analysis of array induction logging data is given in "Rapid well-site 2-D inversion of full-spectrum array induction data," Transactions of the 1996 SPE Annual Technical Conference and Exhibition, paper SPE 36505). By use of the method of the present invention, parameters of interest such as the vertical and horizontal resistivities of the formation, layer thicknesses, and length and resistivity of the invaded zone may be determined.

Figure 6A:
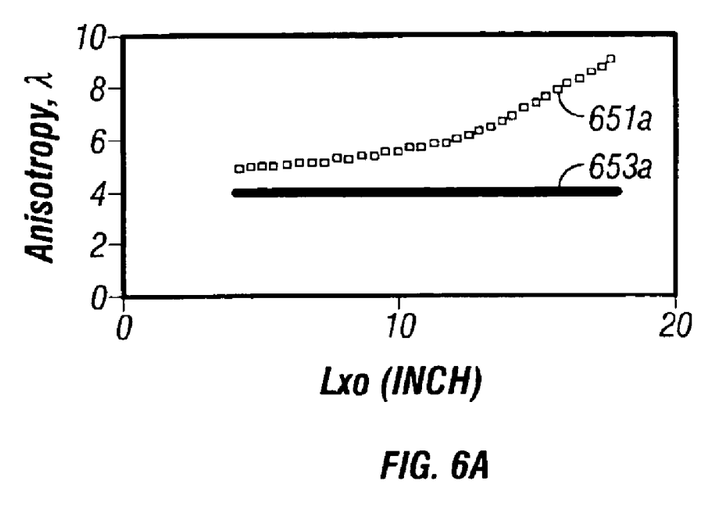
FIGS. 6a and 6b show examples of comparison of the method of the present invention with a prior art method.
Figure 6B:
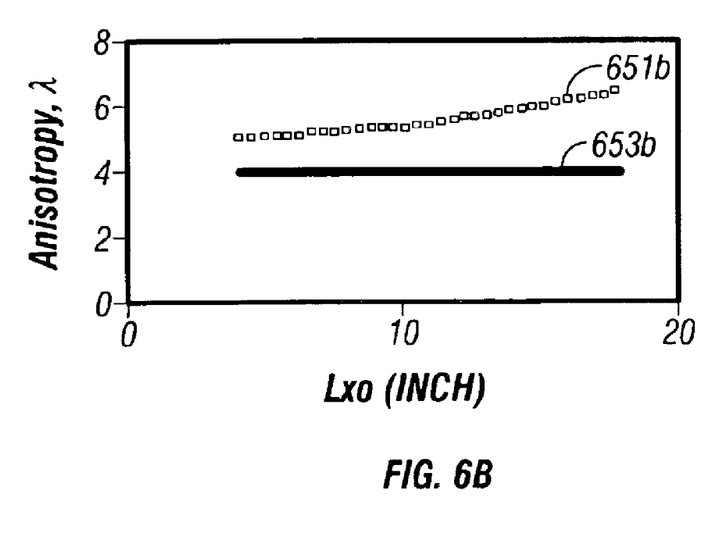

Turning next to FIGS. 6a and 6b, examples of results using the method of the present invention on simulated data and a comparison with a straightforward inversion of 3DEX data are shown. The mud resistivity for generating the simulated ata was 0.02 Ω–m. FIG. 6a corresponds to a borehole diameter of 12 inches while FIG. 6b is for a borehole diameter of 8 inches. The abscissa in each figure is the length of a simulated invasion zone. In both cases, the anisotropy factor was 4.0.

The dashed lines 651a and 651b are the results of prior art inversion (Dual frequency method) using only the 3DEX data. For the inversion, the initial values of the model parameters were within 10% of the true values. The solid lines 653a and 653b are the results of inversion using the method of the present invention, i.e., sequential inversions of the DLL and 3DEX data. Analysis of the inversion results shows that even for moderate anisotropy, in the presence of a highly conductive mud, the deeper the invasion zone, the greater the error in the prior art method.

Figure 7:
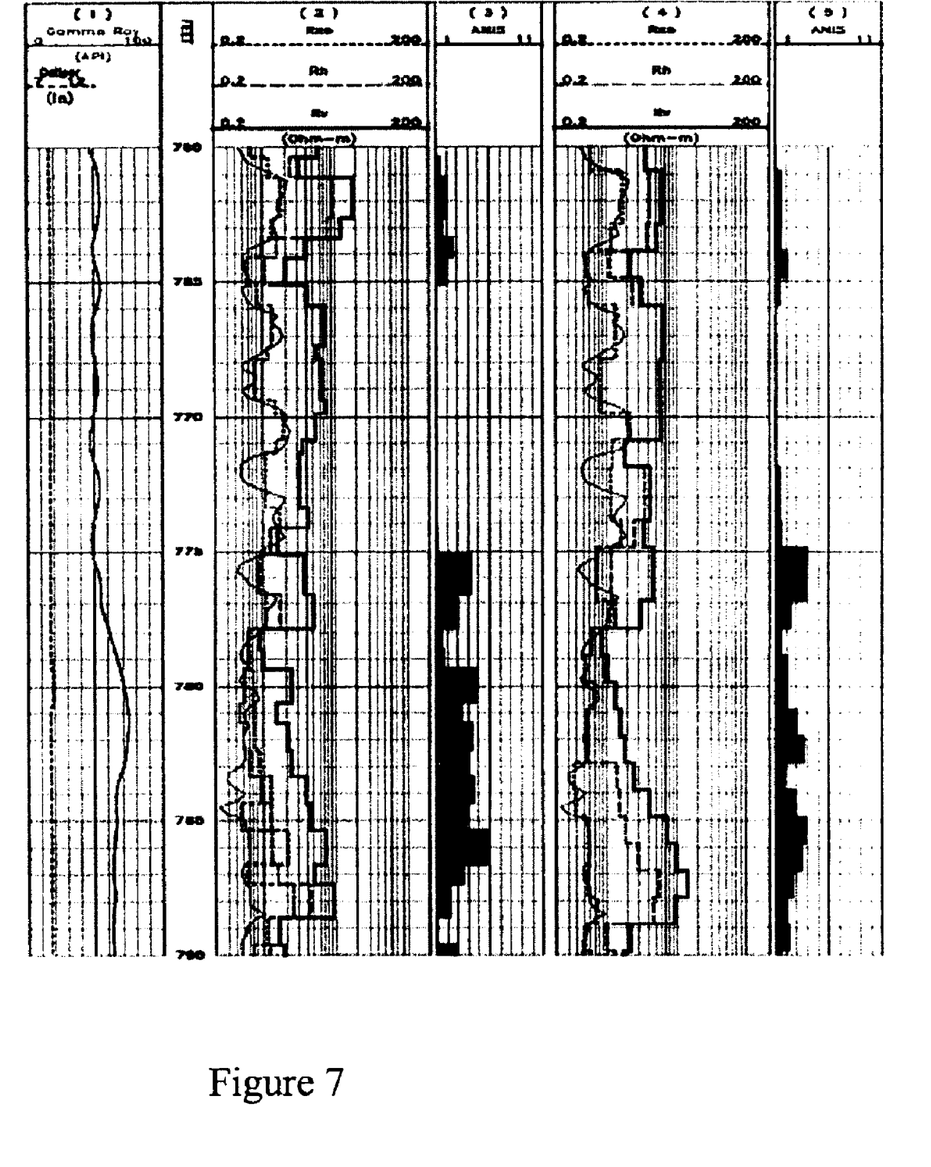
FIG. 7 shows an example of a comparison of results obtained over a depth interval in a well using the method of the present invention with a prior art method.

FIG. 7 shows inversion results for a short (30 ft.) depth interval. All depths are relative. The left track shows the caliper and the gamma ray logs. Tracks 2–3 show the results of the 3DEX inversion and tracks 4–5 show the results of the sequential HDLL and 3DEX inversion over the selected interval. The results are presented as blocky curves, which indicates the resistivity of the invaded zone, $R_{xo}$, the horizontal resistivity, $R_h$, the vertical formation resistivity, $R_v$, and the anisotropy $\lambda$. The depth of the invasion is, on average, $L_{xo} \approx 8-10"$. The smoothest curve is tracks (2) and (4).

It is apparent that the 3DEX induction data inversion approach yields, on average, a 25% higher value of anisotropy (track 3) than the anisotropy obtained with the application of the sequential (HDLL) and induction (3DEX) inversion (tyrack 5). This calculation is in good agreement with results from FIG. 6.

Figure 8:
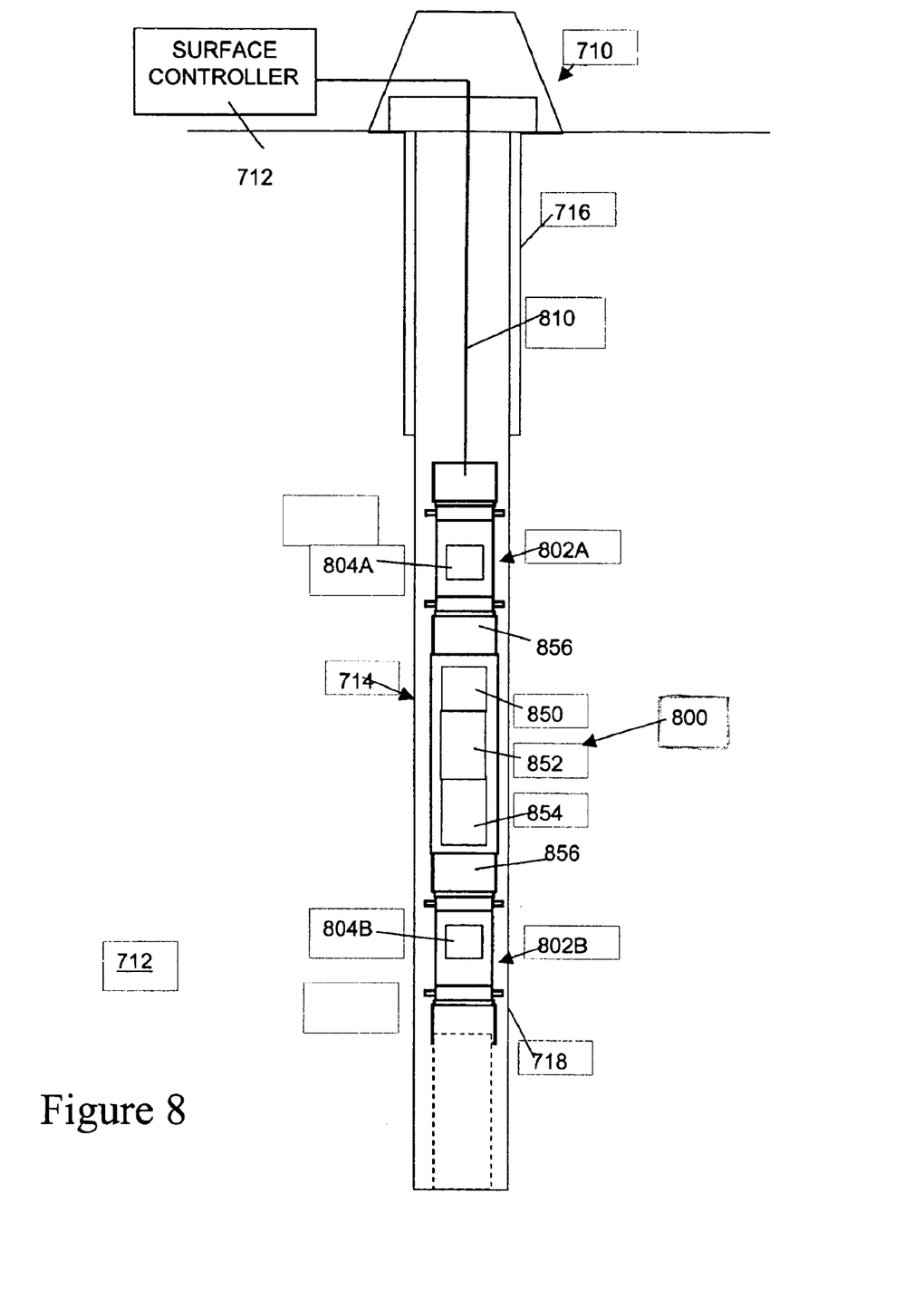
FIG. 8 shows a string of tools suitable for use with the present invention

An exemplary configuration of tools for use with the present invention is shown in FIG. 8. Shown in the figure is a rig 710 on the surface that is positioned over a subterranean formation of interest 712. The rig 710 can be a part of a land or offshore a well production/construction facility. A wellbore 714 formed below the rig 710 includes a cased portion 716 and an open hole portion 718. In certain instances (e.g., during drilling, completion, work-over, etc.), a logging operation is conducted to collect information relating to the formation 712 and the wellbore 714. Typically, a tool system 800 is conveyed downhole via a wireline 810 to measure one or more parameters of interest relating to the wellbore 714 and/or the formation 712. The tool system 800 can include one or more modules 802a,b, each of which has a tool or a plurality of tools 804a,b, adapted to perform one or more downhole tasks. For use with the present invention, these modules could include, e.g., a 3DEX induction, and the other module could be the dual laterolog. The term "module" should be understood to be a device such as a sonde or sub that is suited to enclose, house, or otherwise support a device that is to be deployed into a wellbore. While two modules 802a,b and two associated tools 804a,b, are shown, it should be understood that a greater or fewer number may be used.

In certain embodiments, the tool system 800 can include telemetry equipment 850, a local or downhole controller 852 and a downhole power supply 854. The telemetry equipment 850 provides two-way communication for exchanging data signals between a surface controller 812 and the tool system 800 as well as for transmitting control signals from the surface processor 812 to the tool system 800. The processing of the data may be done entirely downhole, entirely uphole, or a combination of the two. It should further be noted that while the string of tools shown in FIG. 7 is conveyed on a wireline, conveyance may be done by coiled tubing in near horizontal boreholes.

The combination of galvanic and induction measurements can effectively extend the dynamic range of multi-component induction measurements, allowing the use of this technology in wells drilled with conductive WBM systems. The use of this information leads to significantly more accurate hydrocarbon-in-place estimates in electrically anisotropic laminated reservoirs.

With relatively minor modifications, the present invention may also be used in Measurement-While-Drilling (MWD) applications wherein the sensor modules are conveyed downhole on a drilling tubular such as a drillstring or coiled tubing.

While the foregoing disclosure is directed to the preferred embodiments of the invention, various modifications will be apparent to those skilled in the art. While specific embodiments of the microresistivity tool and induction logging tool have been discussed above, it is to be understood that the tools may be used either on a wireline-or in an MWD environment. It is to be further understood that the anisotropy measurements discussed above with reference to an induction logging tool may also be obtained using a propagation resistivity tool. It is intended that all variations within the scope and spirit of the appended claims be embraced by the foregoing disclosure.

What is claimed is:

1. A method of determining a parameter of interest of an earth formation using a tool conveyed in a borehole in the earth formation, the method comprising:
   (a) obtaining measurements indicative of said parameter of interest with a galvanic instrument responsive to a property of the earth formation proximate to the borehole (near zone);
   (b) determining from said measurements a model comprising a property of said near zone;
   (c) obtaining multicomponent measurements indicative of a vertical resistivity of said earth formation; and
   (d) determining from said model and said multicomponent measurements said parameter of interest.

2. The method of claim 1 wherein said property of said model comprises at least one of (i) thicknesses of a plurality of layers, (ii) a length of the near zone corresponding to a plurality of layers, (iii) a resistivity of the near zone corresponding to a plurality of layers, and (iv) horizontal resistivities of said earth formation outside said near zone.

3. The method of claim 1 wherein said parameter of interest comprises at least one of (i) a vertical resistivity of said earth formation, and, (ii) an anisotropy factor for said earth formation.

4. The method of claim 1 wherein said galvanic instrument comprises at least one of (i) a Dual Laterolog/Microlaterolog (DLL/MLL), and (ii) a High-Definition Lateral Log/Microlaterolog (HDLL/MLL).

5. The method of claim 1 wherein determining said model comprises performing an inversion of measurements made by said galvanic instrument.

6. The method of claim 1 wherein determining said parameter of interest further comprises performing an inversion of said multicomponent measurements wherein thicknesses of layers are fixed in said inversion.

7. The method of claim 6 wherein performing said inversion further comprises defining a global objective function that is the sum of a data objective function and a model objective function.

8. The method of claim 6 wherein performing said inversion further comprises using a rapid inversion algorithm.

9. The method of claim 8 wherein said rapid inversion is performed substantially at the well site.

10. The method of claim 1 wherein said multicomponent measurements comprise measurements made at a plurality of frequencies.

11. The method of claim 1 wherein said multicomponent measurements comprise measurements made at two frequencies.

12. An apparatus for use in a borehole in an earth formation for determining a parameter of interest of the earth formation, the apparatus comprising:
(a) a galvanic resistivity measuring instrument responsive to a property of the earth formation proximate to the borehole (near zone);
(b) a processor which determines from said measurements made by said galvanic instrument a model comprising properties of said near zone;
(c) a second resistivity measuring instrument which obtains measurements indicative of a vertical resistivity of said earth formation, wherein said second instrument comprises an induction device having a plurality of transmitter-receiver combinations, wherein at least one transmitter or at least one receiver comprises an antenna with an axis inclined to an axis of the second instrument; and
(d) a processor which determines said parameter of interest from said first model and said measurements made by said second instrument.

13. The apparatus of claim 12 wherein said galvanic instrument comprises at least one of (i) a Dual Laterolog/Microlaterolog (DLL/MLL), and (ii) a High-Definition Lateral Log/Microlaterolog (HDLL/MLL).

14. The apparatus of claim 12 wherein said galvanic instrument comprises an array device.

15. The apparatus of claim 12 wherein said model further comprises (i) thicknesses of a plurality of layers, (ii) a length and resistivity of an invaded zone corresponding to said plurality of layers, and (iii) a horizontal resistivity of said earth formation outside said invaded zone.

16. The apparatus of claim 12 wherein said parameter of interest comprises at least one of (i) a vertical resistivity of said earth formation, and (ii) an anisotropy factor for said earth formation.

17. The apparatus of claim 12 wherein determining said model comprises performing an inversion of measurements made by said galvanic instrument.

18. The apparatus of claim 12 wherein determining said parameter of interest further comprises performing an inversion of said measurements made by said second instrument wherein thicknesses of a plurality of layers, and a length and a resistivity corresponding to each of said plurality of layers are fixed in said inversion.

19. The apparatus of claim 12 wherein said processor in (d) performs said inversion substantially at the well site.

20. The apparatus of claim 12 wherein at least one of said processor in (b) and said processor in (d) is at i surface location.

21. The apparatus of claim 12, wherein at least one of said processor in (b) and said processor in (d) is at a downhole location.

22. A system for estimating a parameter of interest of an earth formation penetrated by a borehole, the system comprising:
(a) a galvanic resistivity measuring instrument responsive to a property of the earth formation proximate to the borehole (near zone);
(b) a processor which determines from said measurements made by said galvanic instrument a model comprising properties of said near zone;
(c) a second resistivity measuring instrument which obtains measurements indicative of a vertical resistivity of said earth formation;
(d) a processor which determines said parameter of interest from said model and said measurements made by said second instrument; and
(e) a conveyance device which conveys said galvanic and second instruments into said borehole.

23. The system of claim 22 wherein said conveyance device comprises a wireline.

24. The system of claim 22 wherein said conveyance device comprises coiled tubing.

25. The system of claim 22 wherein said conveyance device comprises a drilling tubular.

26. The system of claim 22 wherein said second instrument comprises an induction device having a plurality of transmitter-receiver combinations, wherein at least one transmitter or at least one receiver comprises an antenna with an axis inclined to an axis of the second instrument.

* * * * *